United States Patent [19]

Fisher

[11] Patent Number: 4,865,274

[45] Date of Patent: Sep. 12, 1989

[54] PASSIVE CONTROL ASSEMBLY FOR GLIDING DEVICE

[75] Inventor: Jeffrey A. Fisher, Huntsville, Ala.

[73] Assignee: United Technologies Corporation, Hartford, Conn.

[21] Appl. No.: 188,514

[22] Filed: Apr. 29, 1988

[51] Int. Cl.$^4$ ............................................. B64D 17/34
[52] U.S. Cl. .................. 244/152; 244/1 TD; 244/93
[58] Field of Search .............. 244/93, 155 A, 152, 244/1 TD, 3

[56] References Cited

U.S. PATENT DOCUMENTS

| | | | |
|---|---|---|---|
| 1,765,195 | 6/1930 | Ax | 244/93 |
| 3,433,441 | 3/1969 | Cummings | 244/152 |
| 4,557,439 | 12/1985 | Puskas | 244/152 |
| 4,729,530 | 3/1988 | Jalbert | 244/155 A |
| 4,738,414 | 4/1988 | McCulloh | 244/1 TD |

FOREIGN PATENT DOCUMENTS 506633 8/1920 France ............................ 244/93

Primary Examiner—Joseph F. Peters, Jr.
Assistant Examiner—Rodney Corl

[57] ABSTRACT

A towable gliding flexible wing craft for hauling a payload including a passive control means for responding to deviations from level flight. The gliding wing craft comprises a gliding flexible wing, spreader bar, support means for securing said gliding flexible wing to said spreader bar, a bridled tow line secured to said spreader bar for towing said gliding craft, means for securing said payload to said spreader bar and control means for causing wing tip lift or control dragulation of said wing. The control means is capable of passively responding in an opposing manner to deviations from level flight resulting in substantially level flight.

8 Claims, 3 Drawing Sheets

PASSIVE CONTROL ASSEMBLY FOR GLIDING DEVICE

DESCRIPTION

1. Technical Field

The field of art to which this invention pertains is gliding flexible wings and particularly gliding flexible wings that use tip drag inducement for flight control.

2. Background Art

There are a variety of gliding flexible wing devices including ram air parachutes, flexible parawings, rigid spar parawings, hang gliders, gliding parachutes, volplanes, paraplanes, parafoils, and sail wings. Many of these aircraft rely on regulation of the position of wing tips (e.g. inducing differential lift or drag on the wing) in order to control flight. A variety of terms are used to describe wing tip control such as trailing edge deflection, tip drag induced yaw, wing warping or wing twisting. There are a variety of assemblies for controlling the wing tips including wing tip drag rudders, ram air inlet restricters, spoilers, weight shift and simple control lines for wing warping. Control lines are typically connected to the wing tips or outboard trailing edge.

In one type of ram air gliding parachute, a person hangs from the parachute by shroud lines connected from the parachute to his shoulders. Control lines connected to the parachute outboard trailing edge are controlled by hand motions. Other ram air gliding parachutes use remote controlled motors to manipulate the control lines. The configurations of both the human controlled gliding parachute and the motor controlled gliding parachute are depicted in FIGS. 1 and 2 respectively.

In many instances it is impractical to have a human controlled gliding parachute or a motor controlled gliding parachute. Unfortunately, without adequate wing tip controls gliding parachutes consistently experience "lockout" under towing conditions. Lockout occurs when the glider turns slightly out of line with the tow vehicle. The tow line angle tends to roll the wing in the direction of the turn, thus amplifying the error. The wing's airspeed and turn accelerate until ground impact.

Thus, there is a constant need for gliding device control systems that do not result in "lockout" yet do not require direct human control or complex control systems.

DISCLOSURE OF INVENTION

This invention is directed to a towable, gliding flexible wing craft for hauling a payload including a passive control means for responding to deviations from level flight. The gliding wing craft comprises a gliding flexible wing, spreader bar, support means for securing said gliding flexible wing to said spreader bar, a bridled tow line secured to said spreader bar for towing said gliding craft, means for securing said payload to said spreader bar and control means for causing wing tip lift or control dragulation at said wing. The control means is capable of passively responding in an opposing manner to deviations from level flight resulting in substantially level flight.

The foregoing and other features and advantages of the present invention will become more apparent from the following description and accompanying drawings.

BEST MODE FOR CARRYING OUT THE INVENTION

Figure 1:
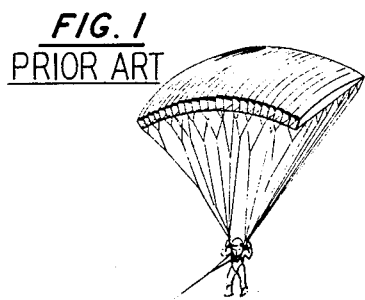
FIG. 1 illustrates a human controlled gliding parachute under towing conditions.
Figure 2:
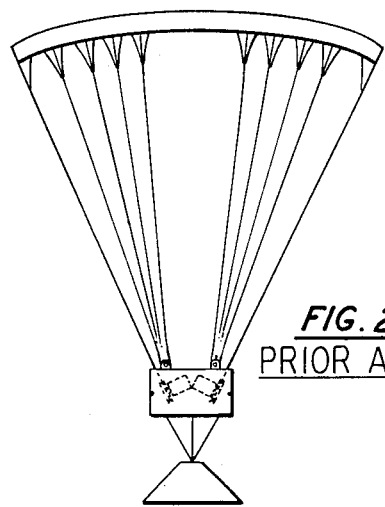
FIG. 2 illustrates a remote operated motor controlled gliding parachute under towing conditions.
Figure 3:
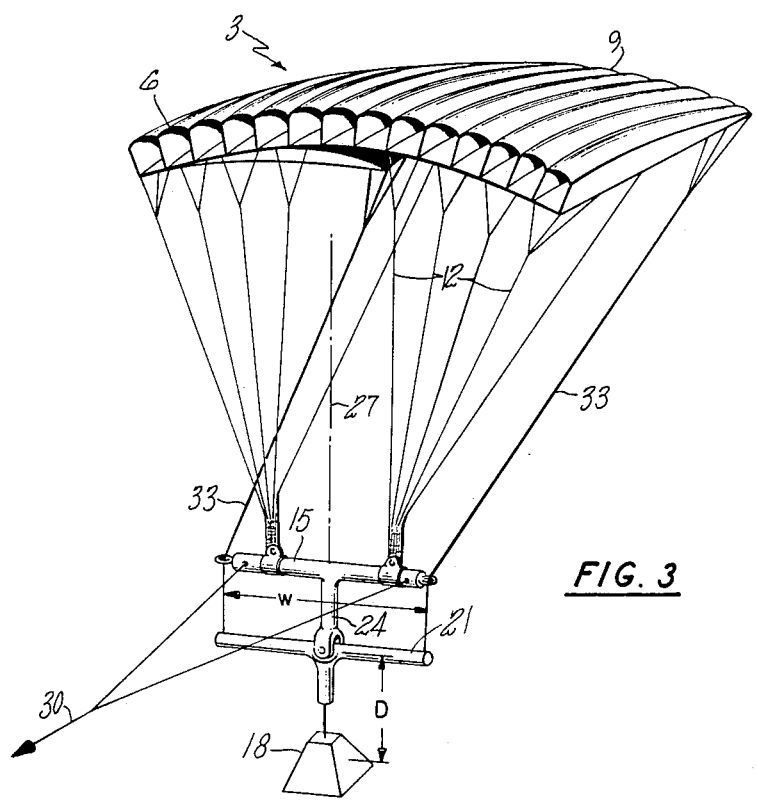
FIG. 3 illustrates a gliding parachute including an exemplary passive control assembly used for inducing differential drag on the wing.
Figure 4:
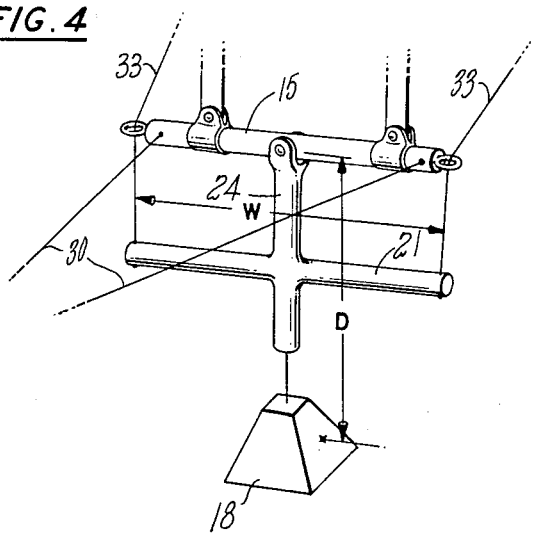
FIGS. 4, 5, 6, and 7 illustrate exemplary passive control assemblies.
Figure 5:
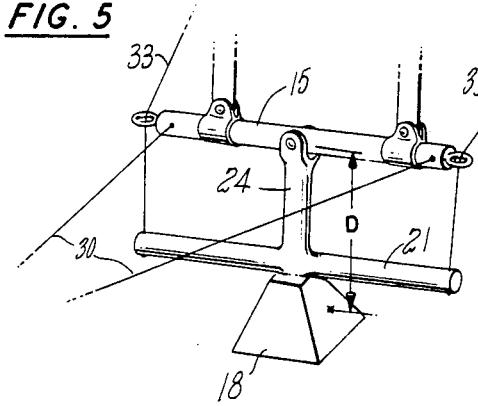
Figure 6:
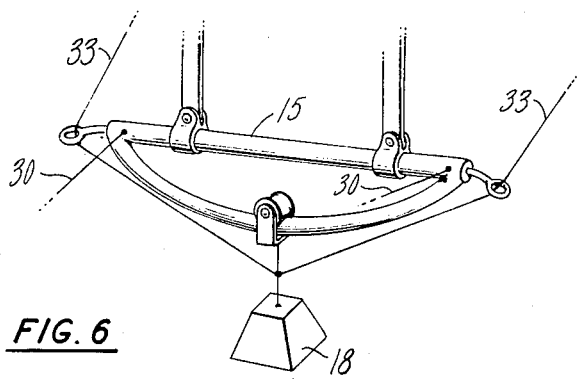

According to FIG. 3 the canopy 3 has a leading edge 6 and a trailing edge 9. Support means 12 such as suspension lines are connected from the canopy 3 to a spreader bar 15. The lines 12 are connected to the canopy 3 in a conventional array such as those that provide the canopy 3 with an airfoil-type configuration. The lines 12 are typically attached to the spreader bar 15 at two locations on opposite ends of the spreader bar 15. A payload 18 is connected to the spreader bar 15 though a securing means, such as a control bar 21 and pivotable member 24. The payload 18 can be connected to the control bar 21 directly as depicted in FIG. 5 or it may hang from the control bar as depicted in FIGS. 4 and 6. The pivotable member 24 typically extends from spreader bar 15 and is pivotably connected to control bar 21 as depicted in FIG. 3. However other assemblies may be envisioned such as in FIGS. 4 and 5 where the pivotable member 24 extends from the control bar 2 and is pivotably connected to the spreader bar 15. In yet another configuration the pivotable member 24 is pivotably connected to both the control bar 21 and the spreader bar 15. The pivotable member 24 typically pivots in the plane of the spreader bar 15 and control bar 21. Further in FIG. 6, the means for connecting the payload 18 to the spreader bar 15 comprises means whereby the payload can slide along the spreader bar 15 in its suspended position such as with a track and wheel.

Plane 27 is normal to the spreader bar 15 and intersects the payload 18. This plane represents the center of gravity around which the passive control assembly moves in roll. Typically, the above described canopy 3, suspension lines 12 and below described control lines etc. are evenly distributed around this center of gravity. Thus, control lines 33 are attached on either side of the plane 27 to the control bar 21. The control lines run to the spreader bar 15 and are slidably attached to the spreader bar 15 on either side of plane 27. From the spreader bar 15 the control lines 33 run to the canopy 3. Typically the control lines are attached to the trailing edge 9 of the canopy 3 on either side of plane 27. A tow line 30 is bridled to the spreader bar 15 on either side of plane 27.

This passive control assembly acts to maintain level flight during towing. For example, on an ascending tow, as the wing starts into a turn, the wing will roll to bank in the direction of the turn. The payload continues to hang directly under the center of the control bar. As the wing banks the spreader bar follows. The change in geometry as the spreader bar banks and the control bar stays approximately level, causes the control lines to deflect to correct for the rolling turn. The higher the bank angle, the more control line deflection. The result is a passive, gravity powered control system which holds the wing straight and level throughout towing flight. By passive is meant an assembly that does not require outside interaction (e.g. radio control, human interaction).

Figure 7:
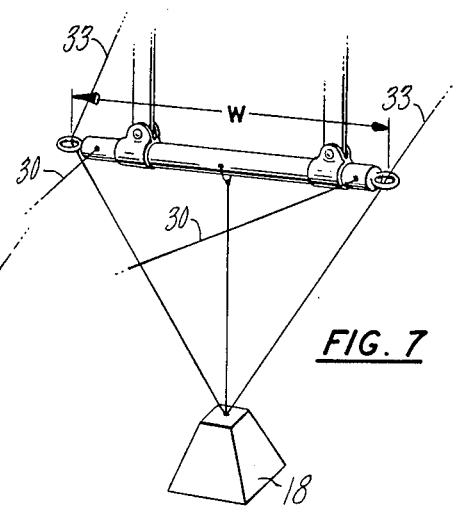

An examination of FIG. 4 illustrates a more theoretical explanation of why the passive control system is believed to work. D represents the distance between spreader bar pivot point and the payload. W represents the distance between the control line attachment points to the control bar. Both D and W are important passive control assembly parameters. The control line "force and travel" are a function of "D" and "W" and thus "D" and "W" determine the amount of "force and travel" extended to the wing. By sensing the payload position as the payload shifts off of the vertical axis; the system senses payload shifts and shifts the wings to bring the payload to the vertical axis thus ensuring level flight. These concepts are further exemplified in FIG. 7 which illustrates a simpler assembly, but one that still has a distance between the payload and pivot point and a distance W between the control line attachment points.

Figure 8:
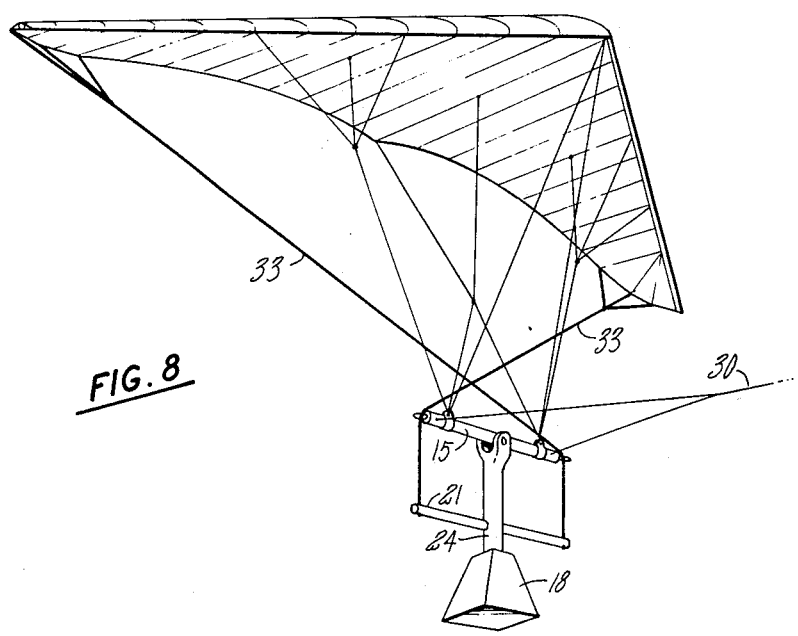
FIG. 8 illustrates a gliding parachute including an exemplary passive control assembly for inducing differential lift on the wing.
Figure 9:
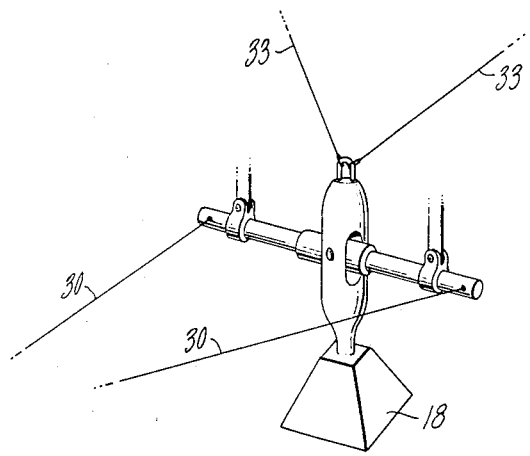
FIG. 9 illustrates an exemplary passive control alternative to the system illustrated in FIG. 8 including a gimbal arrangement.

These concepts also apply to gliding flexible wing devices that rely on the inducement of differential lift on the wing. Thus, FIG. 8 illustrates that since the control forces are reversed, the control lines 33 can be crossed to the opposite side of the wing in order to achieve passive control. In FIG. 9, the control lines are again effectively crossed or reversed to the opposite wing. In this assembly the control lines are attached above the pivot point to effect the control reversal. FIG. 9 may be compared to FIG. 7 to illustrate passive control system and how it may be reversed in order to accommodate devices that are controlled by drag or lift as this invention may be used to passively control by varying aerodynamic moments.

In addition, FIG. 9 illustrates that the pivot may be gimballed to allow the payload to swing in all directions. This aids in stabilizing the wing in pitch. If the wing pitches up the payload relative to the wing swings back and applies force to both control lines pulling the trailing edge's wing tips down. This increases lift aft of the payload, thus pitching the wing back down.

It should be understood that the invention is not limited to the particular embodiment shown and described herein, but that various changes and modifications may be made without departing from the spirit or scope of this concept as defined by the following claims.

I claim:

1. A gliding flexible wig craft for hauling of a payload comprising a gliding flexible wing, spreader bar, support means for securing said gliding flexible wing to said spreader bar, a bridled tow line secured to said spreader bar for towing said gliding craft, means for securing said payload to said spreader bar, control means for causing wing tip lift or control drag modulation of said canopy wherein the improvement comprises:
   (a) said control means capable of passively responding in an opposing manner to deviations from level flight by sensing shifts in payload position and shifting said wing in response thereto resulting in substantially level flight.

2. The gliding canopy craft as recited in claim 1 wherein
   (a) said payload is displaced from said spreader bar;
   (b) a line normal to said spreader bar and intersecting said payload defines a vertical axis;
   (c) said spreader bar extends on either side of said vertical axis;
   (d) said means for securing said spreader bar to said payload comprising a control bar and pivotable member, said pivotable member extending between and attached to said spreader bar and said control bar, said payload connected to said control bar;
   (e) said control means comprises control lines secured to said gliding canopy wing tips and to said control bar at spaced apart locations, at least one of said locations being on either side of said vertical axis and slidably secured to said spreader bar at spaced apart locations, at least one of said locations being on either side of said vertical axis; and
   (f) said tow line bridled to said spreader bar on either side of said vertical axis to maintain said spreader bar perpendicular to flight path.

3. The gliding craft as recited in claim 2 wherein said pivotable member pivots at said control bar.

4. The gliding craft as recited in claim 3 wherein said payload is connected to a member that extends from said control bar.

5. The gliding craft as recited in claim 2 wherein said pivotable member pivots at said spreader bar.

6. The gliding craft as recited in claim 5 wherein said payload is connected to a member that extends from said control bar.

7. The gliding canopy craft as recited in claim 1 wherein:
   (a) said payload is displaced from said spreader bar;
   (b) a line normal to said spreader bar and intersecting said payload defines a vertical axis;
   (c) said spreader bar extends on either side of said vertical axis:
   (d) said means for securing said spreader bar to said payload comprising a sliding means, said sliding means secured to said payload and slidably secured to said spreader bar so that said sliding means can slide along said spreader bar;
   (e) said control means comprises control lines secured to said payload and slidably secured to said spreader bar at spaced apart locations, at least one of said locations being on either side of said vertical axis; and
   (f) said tow line bridled to said spreader bar on either side of said vertical axis to maintain said spreader bar perpendicular to flight path.

8. The gliding canopy craft as recited in claim 1 wherein:
   (a) said payload is displaced from said spreader bar;
   (b) a line normal to said spreader bar and intersecting said payload defines a vertical axis;
   (c) said spreader bar extends on either side of said vertical axis;
   (d) said means for securing said spreader bar to said payload comprising a pivotable member, said pivotable member pivotably connected to said spreader bar and said pivotable member having an upper portion extending above said spreader bar and a lower portion extending below said spreader bar, said payload connected to said lower portion;
   (e) said control means comprises control lines secured to said gliding canopy wing tips and to said upper portion of said pivotable member; and
   (f) said tow line bridled to said spreader bar on either side of said vertical axis to maintain said spreader bar perpendicular to flight path.

* * * * *

UNITED STATES PATENT AND TRADEMARK OFFICE
CERTIFICATE OF CORRECTION

PATENT NO. : 4,865,274
DATED : September 12, 1989
INVENTOR(S) : JEFFREY A. FISHER It is certified that error appears in the above-identified patent and that said Letters Patent are hereby corrected as shown below:

Col. 2, line 38, after "bar", delete "2" and insert --21--.

Col. 3, line 53, after "flexible", delete "wig" and insert --wing--.

Signed and Sealed this

Fourth Day of September, 1990

Attest:

HARRY F. MANBECK, JR.

*Attesting Officer*    *Commissioner of Patents and Trademarks*